(12) United States Patent
Andersen et al.

(10) Patent No.: US 10,735,387 B2
(45) Date of Patent: Aug. 4, 2020

(54) SECURED NETWORK BRIDGE

(71) Applicant: Unisys Corporation, Blue Bell, PA (US)

(72) Inventors: Barry C. Andersen, Wyoming, MN (US); Steven M. Wierdsma, Eagan, MN (US); Joshua M. Chamberland, Eagan, MN (US); Kevin Lui, Irvine, CA (US); Kelsey L. Bruso, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 165 days.

(21) Appl. No.: 15/977,943

(22) Filed: May 11, 2018

(65) Prior Publication Data

US 2019/0020637 A1   Jan. 17, 2019

Related U.S. Application Data

(60) Provisional application No. 62/504,712, filed on May 11, 2017.

(51) Int. Cl.
  *H04L 29/06* (2006.01)
  *H04L 12/741* (2013.01)
  *H04L 12/947* (2013.01)
  *H04L 12/755* (2013.01)
  *H04L 9/08* (2006.01)
  (Continued)

(52) U.S. Cl.
  CPC ........ *H04L 63/0485* (2013.01); *H04L 9/0819* (2013.01); *H04L 9/321* (2013.01); *H04L 45/021* (2013.01); *H04L 45/66* (2013.01);

*H04L 45/745* (2013.01); *H04L 49/25* (2013.01); *H04L 63/0245* (2013.01); *H04L 69/22* (2013.01);
(Continued)

(58) Field of Classification Search
  CPC ............ H04L 63/0485; H04L 63/0245; H04L 63/0272; H04L 63/0281; H04L 9/0819; H04L 9/321; H04L 45/021; H04L 45/66; H04L 45/745; H04L 49/25; H04L 69/22
  See application file for complete search history.

(56) References Cited

U.S. PATENT DOCUMENTS 8,966,240 B2 * 2/2015 Chopra ................... H04L 45/50
                                                    370/389
9,137,154 B2 * 9/2015 Angst ................. H04L 12/4675
(Continued)

*Primary Examiner* — Hee K Song

(57) ABSTRACT

Methods and systems for securing communications with an enterprise from a remote computing system are disclosed. The enterprise is included within a community of interest. One method includes authenticating a bridge appliance with an authentication server associated with an enterprise having secure communications, and receiving a packet at the bridge appliance. The method also includes decrypting the packet to provide a decrypted packet in a case where the packet is encrypted according to a cryptographic key associated with the enterprise, and forwarding the decrypted packet to a remote computing device in communication with the bridge appliance. The method additionally includes, in a case where the packet is received from the remote computing device, encrypting the packet according to a cryptographic key associated with the enterprise, to provide an encrypted packet, and forwarding the encrypted packet to an endpoint within the enterprise.

17 Claims, 11 Drawing Sheets

(51) Int. Cl.
*H04L 9/32* (2006.01)
*H04L 12/721* (2013.01)
(52) U.S. Cl.
CPC ...... *H04L 63/0272* (2013.01); *H04L 63/0281* (2013.01)

(56) References Cited

U.S. PATENT DOCUMENTS

| | | | |
|---|---|---|---|
| 9,253,252 B2* | 2/2016 | Agarwal | H04L 67/1002 |
| 2005/0125692 A1* | 6/2005 | Cox | H04L 63/0236 |
| | | | 726/4 |
| 2005/0198374 A1* | 9/2005 | Suzuki | H04L 29/12009 |
| | | | 709/238 |
| 2007/0147378 A1* | 6/2007 | Elgebaly | H04L 63/0272 |
| | | | 370/392 |
| 2010/0153701 A1* | 6/2010 | Shenoy | H04L 12/4633 |
| | | | 713/151 |
| 2015/0117451 A1* | 4/2015 | Kaneriya | H04L 45/745 |
| | | | 370/392 |
| 2017/0104850 A1* | 4/2017 | Arangasamy | H04L 69/22 |
| 2017/0331733 A1* | 11/2017 | Hooda | H04L 45/74 |

\* cited by examiner

US 10,735,387 B2

SECURED NETWORK BRIDGE

CROSS-REFERENCE TO RELATED APPLICATIONS

The present application claims priority from U.S. Provisional Patent Application No. 62/504,712, filed on May 11, 2017, the disclosure of which is hereby incorporated by reference in its entirety.

TECHNICAL FIELD

The present application relates generally to secured communications and storage systems, and in particular to secured remote access to an enterprise having internal secured communications, using a bridge device.

BACKGROUND

Modern organizations generate, store, and communicate large quantities of data. In many instances, organizations include individuals having different rights to data, or different rights to communicate with other individuals or access particular computing resources. It is frequently important that such organizations be able to quickly and securely access the data stored at the data storage system. In addition, it is frequently important that data stored at a data storage system, or communicated between computing systems, be recoverable if the data is communicated or written incorrectly or are otherwise intercepted or corrupted.

To address the above issues, Unisys Corporation of Blue Bell, Pa. developed a Stealth solution that uses a kernel-level driver to implement end-to-end cryptographic connections for communication of data across public and private networks. This solution allows users to communicate with other users having common user rights, while segregating user groups by way of assignment of different cryptographic keys used for each user group, or "community of interest" (COI). Stealth is an enterprise security system that (1) authenticates endpoints as part of one or more communities of interest, and (2) assigns one or more filters to one or more endpoints to provide communication permissions that enforce a COI as well. In one example, a COI can be enforced with a set of encryption keys. Each COI corresponds to a role, and a set of COIs can be a use profile. The filters can be, for example, a whitelist or block list to allow specific communications as well.

Of course, there may be at least some network devices (e.g., printers, scanners, supervisory control and data acquisition (SCADA) devices, monitors, network-attached machines, webcams, and the like) that are not part of a COI, and which are not equipped with Stealth technology. Unlike participants of a COI, such non-Stealth devices have IP addresses that are visible to other network nodes. It would be desirable, therefore, to provide a method and system that would enable such devices to benefit from Stealth security, even if they do not possess Stealth technology themselves.

SUMMARY

The present application relates generally to secured communications and storage systems, and in particular to secured remote access to an enterprise having internal secured communications, using a bridge device.

In a first aspect, a method for securing communications with an enterprise from a remote computing system is disclosed. The method can include receiving a packet at a bridge appliance, the packet including a source address and a destination address, the source address being one of a remote computing device and a secured computing device within an enterprise network, the destination address being another of the remote computing device and the secured computing device. In a case where the packet is encrypted according to a cryptographic key associated with an enterprise, the method includes removing a routing header from the packet to provide packet contents, decrypting the packet contents to provide decrypted packet contents, reattaching the routing header to the decrypted packet contents to form a decrypted packet, and forwarding the decrypted packet to a remote computing device in communication with the bridge appliance. In a case where the packet is received from the remote computing device in cleartext, the method includes removing the routing header from the packet to provide the packet contents, encrypting the packet contents according to the cryptographic key associated with the enterprise, to provide encrypted packet contents, reattaching the routing header to the encrypted packet contents to provide an encrypted packet, and forwarding the encrypted packet to an endpoint within the enterprise.

In a second aspect, a system enabling secured communications with an enterprise is disclosed. The system includes a bridge appliance comprising a memory storing instructions for performing a method of securing communications with an enterprise, and a processor, operating under control of the instructions. The bridge appliance receives a packet, the packet including a source address and a destination address, the source address being one of a remote computing device and a secured computing device within an enterprise network, the destination address being another of the remote computing device and the secured computing device. In a case where the packet is encrypted according to a cryptographic key associated with an enterprise, the bridge appliance is configured to remove a routing header from the packet to provide packet contents, decrypt the packet contents to provide decrypted packet contents, reattach the routing header to the decrypted packet contents to form a decrypted packet, and forward the decrypted packet to a remote computing device in communication with the bridge appliance. In a case where the packet is received from the remote computing device in cleartext, the bridge appliance is configured to remove the routing header from the packet to provide the packet contents, encrypt the packet contents according to the cryptographic key associated with the enterprise, to provide encrypted packet contents, reattach the routing header to the encrypted packet contents to provide an encrypted packet, and forward the encrypted packet to an endpoint within the enterprise.

In a further aspect, a method of accessing a remote computing device from within a secure enterprise network is disclosed. The method includes receiving, at a bridge appliance of a secure enterprise network, a packet including a routing header including a source address and a destination address, the packet being a cleartext packet, the source address being an address of the remote computing device and the destination address being a secured computing device within the secure enterprise network. The method further includes, in a case where the source address and a hardware address of the remote computing device are not known within the secure enterprise network, updating one or more local routing tables or rules to add the source address and hardware address. The method also includes removing the routing header from the packet to provide the packet contents, encrypting the packet contents according to the cryptographic key associated with the enterprise, to provide encrypted packet contents, reattaching the routing header to the encrypted packet contents to provide an encrypted packet, and forwarding the encrypted packet to an endpoint within the enterprise.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
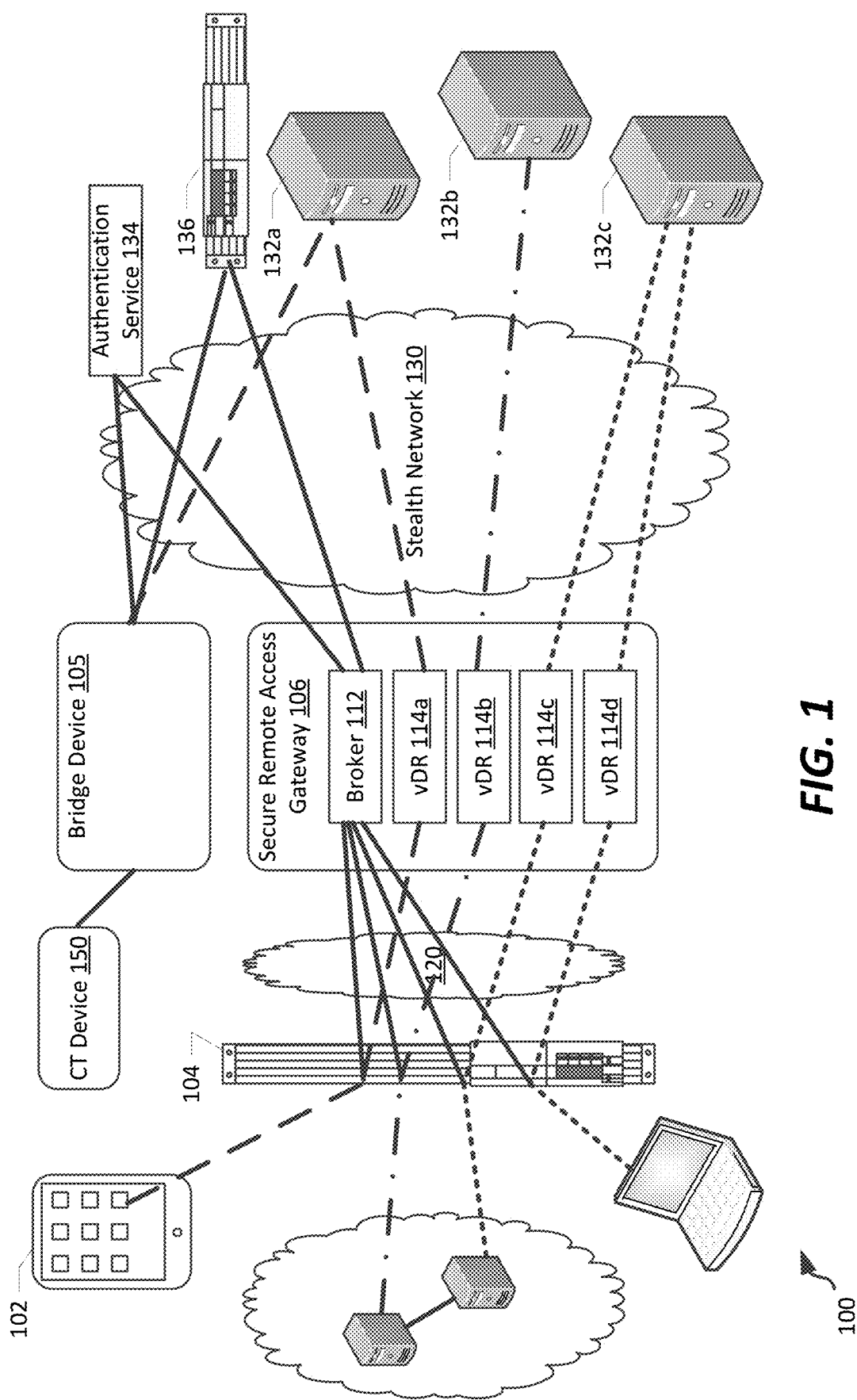
FIG. 1 illustrates an example network in which secured remote communications can be implemented, according to the methods and systems described herein.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to improvements to systems and methods for secured communications with remote devices, such as the Stealth secure communications and storage system of Unisys Corporation of Blue Bell, Pa. As is included in the existing Stealth system, data to be transmitted among endpoints (e.g., client or server computing systems) is encrypted such that (1) no computing system other than the sender and intended recipient can view the contents of the encrypted message(s), and (2) in some embodiments, the messages are configurable such that message packets themselves are split among different packets and optionally transmitted along different transmission paths between computing systems, to ensure receipt of the secured communications at a receiving endpoint. That receiving endpoint can then reconstruct the message based on one or more such received split and encrypted messages.

In accordance with the present disclosure, the below-listed application generally describe the Stealth security environment, and are incorporated herein by reference in their entireties:

The present application incorporates the disclosure of each of the following U.S. patents and patent applications:

U.S. Provisional patent application Ser. No. 15/001,354 filed on Jan. 20, 2016.

The present application claims priority from U.S. patent application Ser. No. 14/753,437 filed on Jun. 29, 2015.

U.S. Provisional patent application entitled: Distributed Security on Multiple Independent Networks using Secure "Parsing" Technology, by Robert Johnson, Ser. No. 60/648,531, filed 31 Jan. 2005.

U.S. patent application entitled: Integrated Multi-Level Security System, by Robert Johnson, US. Ser. No. 11/339,974 filed 26 Jan. 2006.

U.S. patent application entitled: Integrated Multi-Level Security System, by Robert Johnson et al., Ser. No. 11/714,590 filed 6 Mar. 2007 which is a continuation-in-part of U.S. application Ser. No. 11/339,974.

U.S. patent application entitled: Integrated Multi-Level Security System, by Robert Johnson et al., Ser. No. 11/714,666 filed 6 Mar. 2007 which is a continuation-in-part of U.S. application Ser. No. 11/339,974; and U.S. patent application entitled: Integrated Multi-Level Security System, by Robert Johnson et al. Ser. No. 11/714,598 filed 6 Mar. 2007 which is a continuation-in-part of U.S. application Ser. No. 11/339,974.

U.S. patent application Ser. No. 12/272,012, entitled "Block Level Data Storage Security System", filed 17 Nov. 2008, The present disclosure also claims the benefit of commonly assigned U.S. patent application Ser. No. 12/336,558, entitled "Data Recovery Using Error Strip Identifiers", filed 17 Dec. 2008.

U.S. patent application Ser. No. 12/336,559 entitled "Storage Security Using Cryptographic Splitting", filed 17 Dec. 2008, U.S. patent application Ser. No. 12/336,562, entitled "Storage Security Using Cryptographic Splitting", filed 17 Dec. 2008, U.S. patent application Ser. No. 12/336,564, entitled "Storage Security Using Cryptographic Splitting", filed 17 Dec. 2008, and U.S. patent application Ser. No. 12/336,568, entitled "Storage Security Using Cryptographic Splitting", filed 17 Dec. 2008.

U.S. patent application Ser. No. 12/342,636 entitled "Storage Communities Of Interest Using Cryptographic Splitting", filed 23 Dec. 2008, U.S. patent application Ser. No. 12/342,575, entitled "Storage Communities Of Interest Using Cryptographic Splitting", filed 23 Dec. 2008, U.S. patent application Ser. No. 12/342,610, entitled "Storage Communities Of Interest Using Cryptographic Splitting", filed 23 Dec. 2008.

U.S. patent application Ser. No. 12/342,379, entitled "Secure Network Attached Storage Device Using Cryptographic Splitting", filed 23 Dec. 2008.

U.S. patent application Ser. No. 13/493,023, entitled "Software Handling Of Hardware Error Handling In Hypervisor-Based Systems", filed 5 Sep. 2012.

U.S. patent application Ser. No. 13/547,148, entitled "Automated Provisioning of Virtual Machines", filed 12 Jul. 2012.

U.S. patent application Ser. No. 14/042,239, entitled "Negotiation of Security Protocols and Protocol Attributes in Secure Communications Environment", filed 30 Sep. 2013.

U.S. patent application Ser. No. 14/042,182, entitled "Secured Communications Arrangement Applying Internet Protocol Security", filed 30 Sep. 2013.

The present disclosure specifically describes aspects of secure communications and secure computing systems that provide for a flexible manner in which remote devices of various types can connect to a secured network, such as a network secured with Stealth technology, even in cases where the remote devices themselves are not equipped with Stealth-functionality. Such remote devices can connect to and securely communicate with endpoints within that secured network by virtue of a method and a system according to an example aspect herein. Furthermore, the present application describes a connectivity method and system by which specific devices, users, or applications themselves may be specifically associated with a group of affiliated computing resources such that only those resources within the secured network are visible to that associated device, user, or application. Other endpoints or computing resources within the secured network remain present, but are entirely opaque to the mobile device if not within the same community of interest. Accordingly, even specifically-addressed messages directed to such endpoints will not be responded to (even with a response denying connection) thereby avoiding potential security issues that may be caused by denial of service attacks or other potential security compromise situations that do not require establishment of a connection to interfere with network operations. Accordingly, the present disclosure provides an additional layer of security in addition to traditional VPN connectivity, which is traditionally controlled or secured only at the level of user/device, and provides for connectivity scenarios associated with remote endpoints of varying trust levels, such as remote mobile devices, remote servers, remote workstation endpoints (static and mobile), and other such scenarios.

Referring now to FIG. 1, a network 100 in which communication is enabled between one or more remote endpoints and secured endpoints included within a secured network (e.g., an enterprise) is shown. The network 100 includes a plurality of remote devices 102, such as a remote mobile device 102a, a remote laptop 102b, a plurality of remote office devices at a remote office 103, such as remote servers 102c-d. A VPN server 104 allows for communication via a trusted subnet 120 to a secure remote access gateway 106.

In example embodiments, the VPN server 104 connects to an external network which is also accessible by the remote devices 102. The VPN server 104 authenticates and establishes an IPsec tunnel between itself and the respective remote device 102, assigning it an IP address and subsequently routing traffic to the trusted subnet 120.

The secure remote access gateway 106 generally receives messages from the VPN server 104, relayed from the remote computing device 102, via a portion of the enterprise network shown as a trusted subnet 120, which is dedicated to secure message routing between one or more VPN servers 104 and secure remote access gateways 106. The trusted subnet 120 may pass messages in cleartext or encrypted form, but in a manner dedicated to such interface communications with devices located remotely from the enterprise. In example embodiments, the trusted subnet may be a physical network connecting devices or a virtual network connecting software within an OS instance or a combination of the two. In all cases the trusted subnet 120 is isolated from the outside network and the Stealth network 130. Accordingly, if so desired, the trusted subnet 120 can be clear-text and would support packet inspection, firewalling and similar features if desired.

The secure remote access gateway 106 is communicatively connected to a Stealth network 130. The Stealth network 130 generally corresponds to a network managed within an enterprise, and which includes a plurality of Stealth network endpoints 132a-c, an authentication server 134, and a licensing server 136. The Stealth network 130 generally implements Stealth-based communications among endpoints within the Stealth network 130, as discussed in the applications incorporated by reference above. In example embodiments, the Stealth network 130 can be implemented using one or both of an IPsec-based Stealth implementation and a multi-level secure tunneling protocol (MLSTP)-based Stealth implementation, as is also described in the applications incorporated by reference above.

In the embodiment shown, the secure remote access gateway 106 includes a VDR broker 112 and a plurality of VDRs 114a-d. The VDR broker 112 interacts with the VPN server 104 and an authentication server 134, and the resources which instantiate instances of a virtual data relay (VDR), to establish routing of traffic to allow a remote device to participate in the Stealth network 130.

The VDR broker 112 acquires a Stealth license; during the authentication and authorization process of each remote endpoint, the authorization manager of the VDR broker 112 will identify itself to the authentication server 134 as a VDR broker 112 for a remote device in an XML-based tuples request, and identifies the authenticating user via HTTP. The authentication server 134 will then indicate to the VDR broker 112 that a Stealth remote system license is available for use. Details regarding example communication sequences useable to establish secure communications between a remote device 102 and Stealth network endpoints 132a-c are described in further detail in the applications incorporated by reference herein. However, in general, to ensure security the VDR broker 112 will not service client connections from remote devices without first securing appropriate licenses, from the authentication server 134 and/or licensing server 136.

The VDRs 114a-d operate as proxies for the remote devices 102a-d, respectively, with which they are associated. Generally, an instance of a VDR exists for each IPsec connection established by the VPN server 104. For example, if a secure connection is established on a per-device basis, each device will be associated with a different VDR 114 as in the embodiment shown.

Generally, each VDR 114 hosts a Stealth network endpoint. The endpoint has been authenticated by the authentication server 134. Traffic routes are established allowing traffic to flow between a stealth network endpoint 132 and the mobile device 102, based on the stealth network endpoint and the associated application (or device, or user, based on the level of granularity of security authorization as implemented).

The VPN server 104 will perform the IPsec authentication and tunnel address assignment with participation by the VDR broker 112. Accordingly, mobile device applications will connect to the VPN server 104 using a user ID for an IPsec authentication, which will also subsequently used for Stealth authentication via the authentication server 134.

FIG. 1 also shows a cleartext (CT) device or endpoint 150 as described in applications incorporated by reference herein, and a Stealth appliance 105 (also referred to herein as a "Stealth Micro Bridge (SMB) device", or a "bridge" according to an example aspect herein. The appliance 105 represented in FIG. 1 is communicatively connected to the CT device 150, the authentication server 134, endpoint 132*a*, and licensing server 136. In one example embodiment, communications between CT device 150 and appliance 105 are in accordance with cleartext, and are secured physically. The connection between device 150 and applicant 105 can be wired or wireless, and appliance 105 in effect serves similarly like a cleartext gateway described in applications incorporated herein by reference.

The CT device 150, according to one example embodiment herein, is provided with an IP address via, for example, a dynamic host configuration protocol (DHCP), and that IP address can be provided to endpoints such as, for example, endpoint 132*a*. The appliance 105 can directly pass through DHCP packets. Stealth appliance 105 can connect to the authentication server 134 using a service key.

According to an example aspect herein, stored in a memory (e.g., memory 302 described below) of the appliance 105 are one or more cryptographic keys of a COI, such as a COI associated with Stealth network 130. In one example embodiment herein, the appliance 105 can authenticate at least once with authentication server 134, and can obtain filters and a set of cryptographic keys for a COI from that server or from licensing server 136, to enable the CT device 150 to participate in a particular, related COI (in the illustrated example, this COI includes devices 102 and 132*a*). The manner of authentication is described in connection with U.S. patent application Ser. No. 14/753,437 filed on Jun. 29, 2015, which was previously incorporated by reference in its entirety. However, as compared to the secure remote access gateway 106, the appliance 105 has a number of differences noted below.

After authentication, the appliance 105 then can act on behalf of the CT device 150 when communicating. The keys are used for encryption/decryption at the appliance 105, and the filters are used for routing rules (e.g., for defining whitelists, blocked endpoints with which cleartext communication is permitted, etc.) in, for example, a Linux stack such as that represented in FIGS. 5*a* and 5*b* discussed below. The appliance 105 acts as a bridging device as compared to a network gateway, and therefore allows the CT device 150 to act as though it is a member of the Stealth network 130, rather than being interfaced to it via a non-Stealth, trusted subnet 120.

In one example embodiment herein, the appliance 105 operates in accordance with SCIP and IKE protocols, and effectively implements IPsec packet spoofing on behalf of the cleartext device 150. The appliance 105 also has its own dedicated IP address, and it can be used for authentication with an authentication server, such as server 134. Such authentication employs that IP address for performing authentication, versus using the IP address of the CT device 150. This can be helpful in the event that COIs are employed in conjunction with the appliance 105 prior to the CT device 150 being connected to the appliance 105.

In general, to ensure security the appliance 105 will not service client connections from remote devices without first securing appropriate licenses, from the authentication server 134 and/or licensing server 136.

In general, comparing the secure remote access gateway 106 and the appliance 105, it is noted that because the appliance 105 is a bridging appliance, the CT device 150 can be allocated an IP address within the address range assigned within the Stealth network 110. This is in part due to the fact that the appliance 105 acts as a layer 2 switch rather than a layer 3 router. Furthermore, the CT device 150 can be directly addressed by Stealth devices, with all traffic being routed through the appliance 105. In this way, the CT device 150 appears Stealth-enabled, even if it does not have the capability to host Stealth encryption thereon. Furthermore, in the embodiment shown, the appliance 105 is shown as joining a common COI with device 132*a*; however, it is noted that the appliance 105 can join multiple COIs, with the only limitation being an assumption that any or all CT device(s) 150 connected to the appliance 150 will be members of the common set of COIs.

Figure 2:
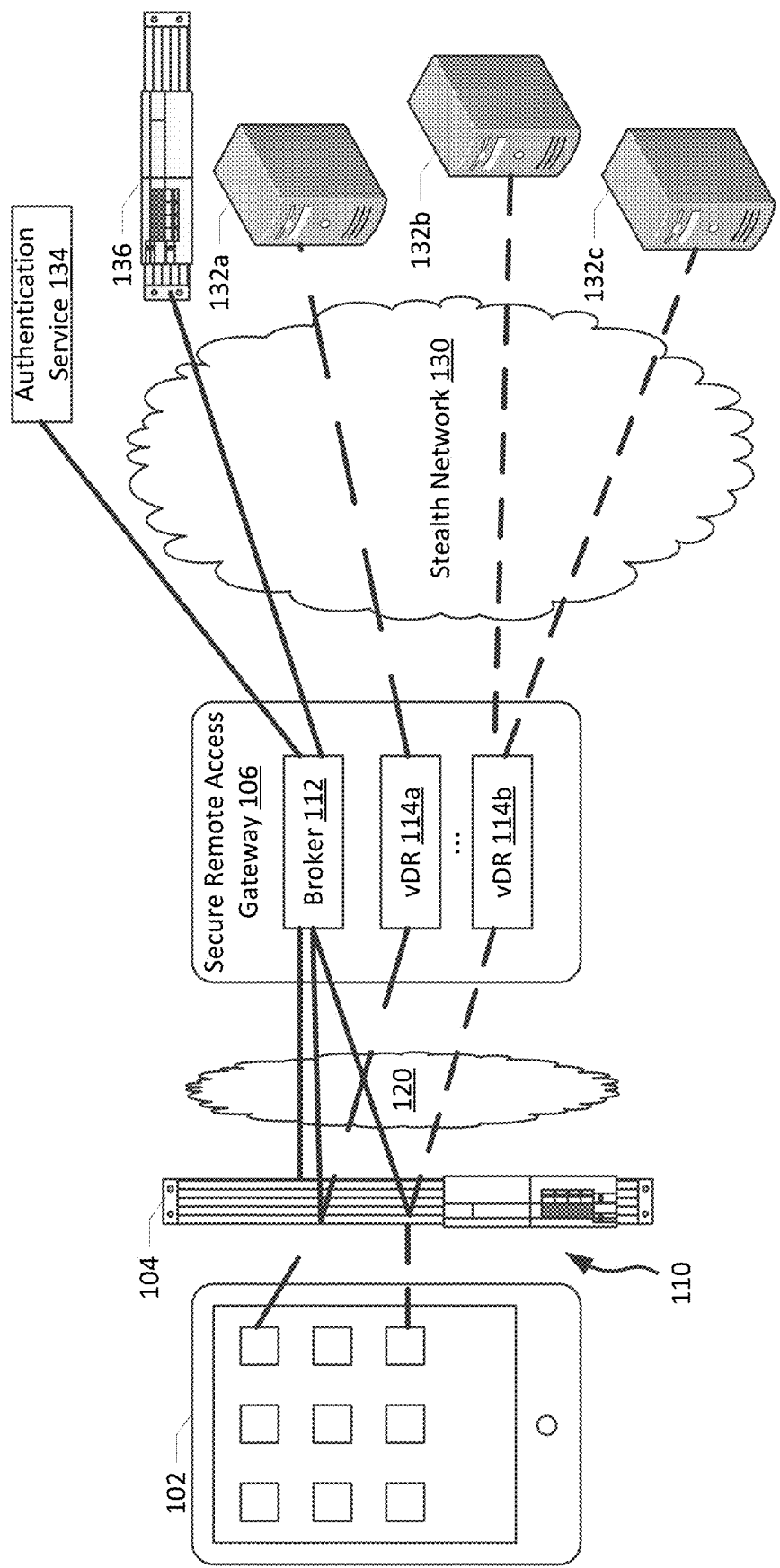
FIG. 2 illustrates a second example network in which secured remote communications can be implemented, according to the methods and systems described herein.

Referring now to FIG. 2, a generalized network 200 in which communication is enabled between a mobile device and one or more secure endpoints included within a secured network (e.g., an enterprise) is shown, according to an example alternative. The network 200 includes a mobile device 102*a* communicatively connected, via public network 110, to a secure remote access server 104 managed by a secured entity. The VPN server 104 allows for communication via a trusted subnet 120 to the secure remote access gateway 106.

In the embodiment shown, the mobile device 102 (and/or CT device 150) generally corresponds to any type of mobile device, such as a mobile phone, tablet, laptop, or other type of mobile device which may be used to connect to a secured network from a variable location and/or subnetwork. In the case of mobile phone and tablet devices, such a device may be an iOS-based device provided by Apple Corporation of Cupertino, Calif., or an Android-based device provided by any of a number of equipment-manufacturers, and operating using a variant of the Android operating system provided by Google, Inc. of Mountain View, Calif. Other types of mobile operating systems could be used as well (e.g., Blackberry, Microsoft's Windows Phone OS, or other operating systems). In preferred embodiments, the mobile device 102 either has a native IPsec implementation allowing it to communicate with a VPN server via an IPsec-based connection, or is capable of having installed thereon an application that manages such a secured connection over a public network. Consequently, the VPN server 104 provides a location at which the mobile device 102 can establish a secure connection to the enterprise, and which relays messages to the mobile gateway which effectively proxies the mobile device within the secure network, as discussed in further detail below. Accordingly, mobile device may be a trusted mobile device, or may alternatively have one or more trusted/secured applications executing thereon in conjunction with unsecured applications. In an example embodiment herein, the device 150 is not equipped with native Stealth technology.

Although in the embodiment shown a single mobile device is illustrated, it is understood that this is intended as exemplary; however, in typical embodiments the mobile broker will manage connections associated with a plurality of different mobile devices, mobile device applications, and/or users.

In the example shown, different applications on the remote device 102 are each associated with different VPN-based connectivity, and have different security credentials. Accordingly, in such an example embodiment, different VDRs (shown as VDRs 114*a-b*) are associated with different applications on the same mobile device 102. In such embodiments, application-level authentication is used to the exclusion of device-level authentication, requiring a user to authenticate himself/herself within each application seeking a secured connection to Stealth network endpoints 132. This allows the remote device 102 of FIG. 2 to securely connect to Stealth network endpoints 132 of an enterprise, while concurrently allowing that same remote device to communicatively connect, for example via cleartext or known encryption protocols, with public or other unsecured network (e.g., Internet) locations.

Referring to FIGS. 1-2 generally, in example embodiments, the IPsec-based Stealth solution can be employed in either an entirely IPsec-based secure network, or within an existing Stealth network employing a traditional bit-based splitting and encrypting/decrypting arrangement, which utilizes an existing multi-level secure transport protocol (ML-STP) secure communications construct. In these configurations, all endpoints in the Stealth network can be required to be licensed with a Stealth license that supports earlier versions of the Stealth security protocol. In addition, Stealth appliance 105 may be used, and all licensing and logging is provided through the Stealth appliance (or team of appliances). However, it is noted that a mixed Stealth configuration may be required when the IPsec-based system is deployed in an existing Stealth network in which endpoints are already running a previous Stealth configuration, or when the existing (or new) Stealth network must support otherwise unsupported endpoints (e.g., Windows XP, Windows 2003).

In addition, in the example representations shown in FIGS. 1-2, a Stealth-enabled application will be provided on each remote device, except for device 150, to allow for secure capture of service connection credentials and user credentials. Additionally, a secure remote access gateway can maintain vDR instantiation and user connections, while the vDRs associated with each remote endpoint can connect internal to the enterprise to other endpoints within a common community of interest. This allows for support for a variety of types of remote and/or roaming workstations or mobile devices.

Figure 3:
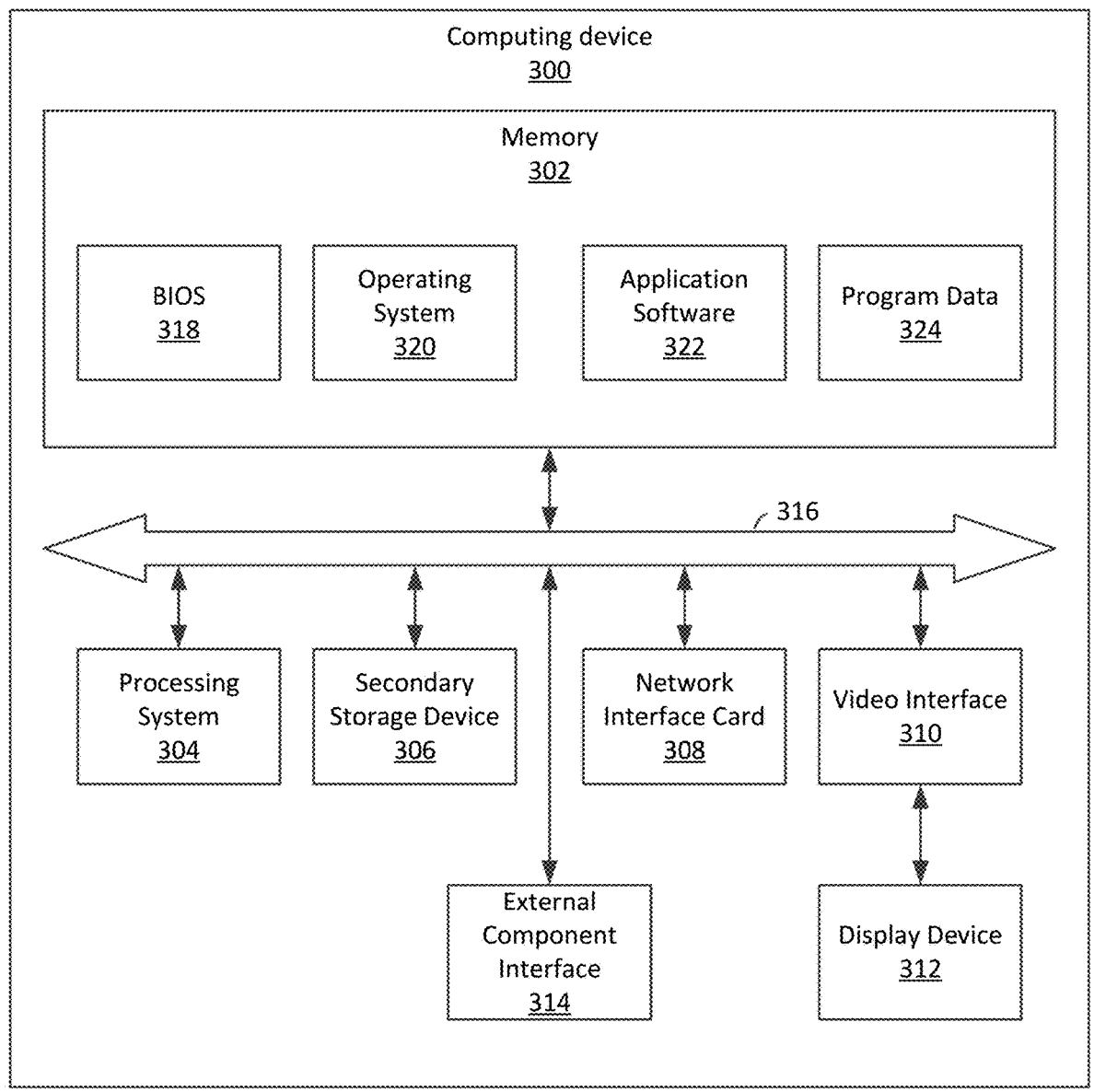
FIG. 3 is a schematic illustration of an example computing system in which aspects of the present disclosure can be implemented.

Referring now to FIG. 3, a schematic illustration of an example computing system in which aspects of the present disclosure can be implemented. The computing device 300 can represent, for example, a computing system capable of implementing the various features of FIGS. 1-2, including any of the variety of mobile devices 102 disclosed therein, the secure remote access gateway 106, Stealth network endpoints 132, CT device 150, Stealth appliance 105, or other systems. In particular, the computing device 300 represents the physical construct of an example computing system at which, for example, an endpoint, bridge, or server could be established. In particular, in various embodiments, the computing device 300 implements one particular instruction set architecture, and can be used to execute non-native software and/or translate non-native code streams in an adaptive manner, for execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

If implemented in firmware and/or software, the functions described herein may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Computer storage media generally includes at least some tangible, non-transitory media and can, in some embodiments, exclude transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media. In accordance with the present disclosure, the term computer readable media as used herein may include computer storage media, but generally excludes entirely transitory embodiments of communication media, such as modulated data signals.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

It is noted that, although in the embodiments of FIG. 3 shown the computing device 300 represents a physical computing system, the various endpoints, bridges, and servers of the present disclosure need not be directly implemented on a hardware-compatible system. Rather, such endpoints, bridges, or servers could be implemented within a virtual computing system or virtual partition of a computing system. In some embodiments, the endpoints, bridges, and/or servers of the present disclosure are implemented in a partitioned, multiprocessor environment, with the various partitions in which endpoints, bridges, and/or servers reside being managed by a system virtualization software package. One such system virtualization package is the Unisys Secure Partitioning (SPar) partitioning and virtualization system provided by Unisys Corporation of Blue Bell, Pa.

In general the endpoints of the present disclosure can be configured various ways, with registry settings selected to configure the endpoint to communicate according to an appropriate communication protocol. In some example embodiments, each IPv6-based system includes a capability to communicate with the authorization server via either IPv4 or IPv6 communications. Other administrator-selected IP-based protocols could be used as well.

Figure 4:
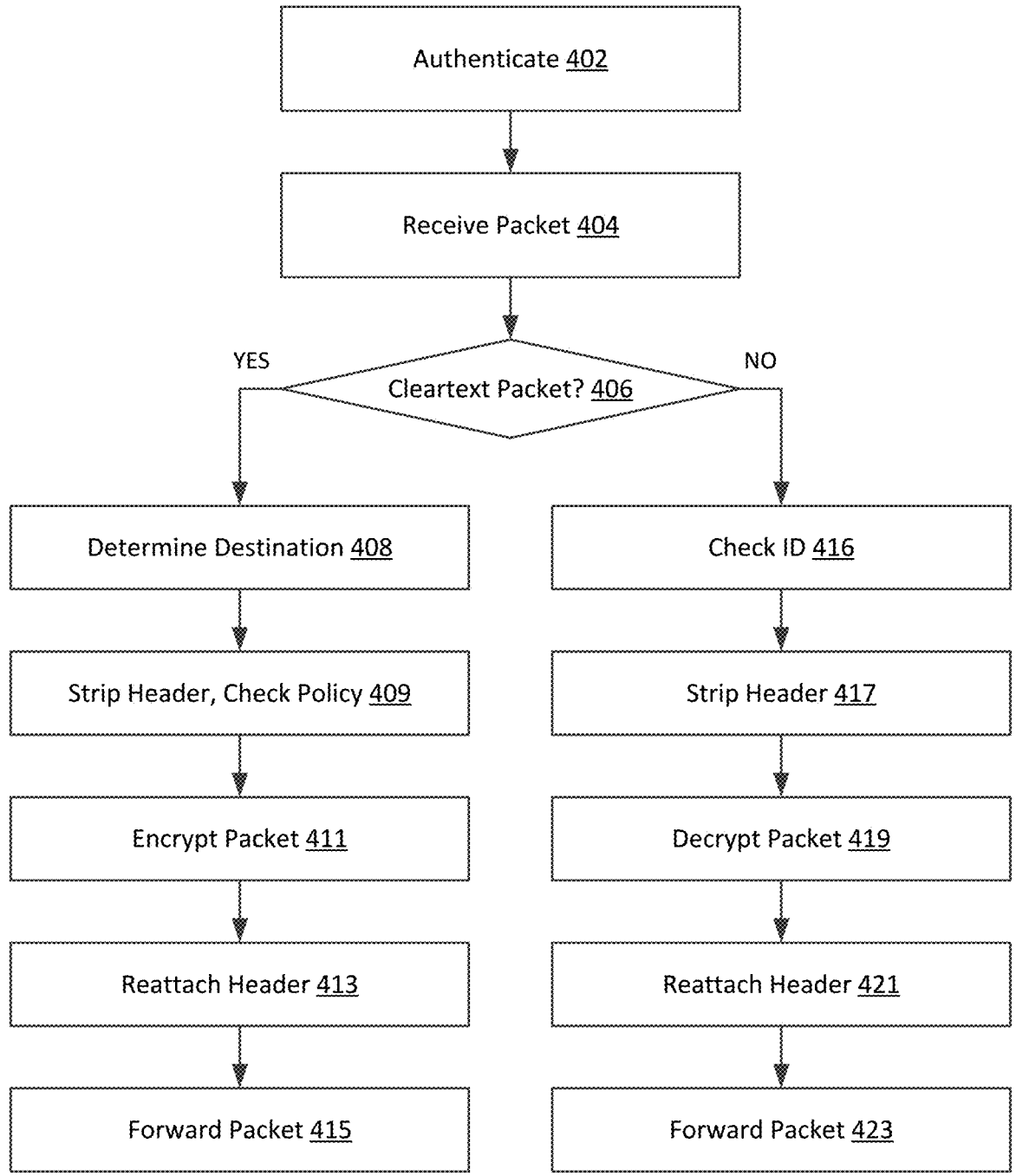
FIG. 4 is an example flow diagram of a method for operating a bridge component that connects a remote computing device to an enterprise having internal secured communications, according to an example aspect herein.
Figure 5A:
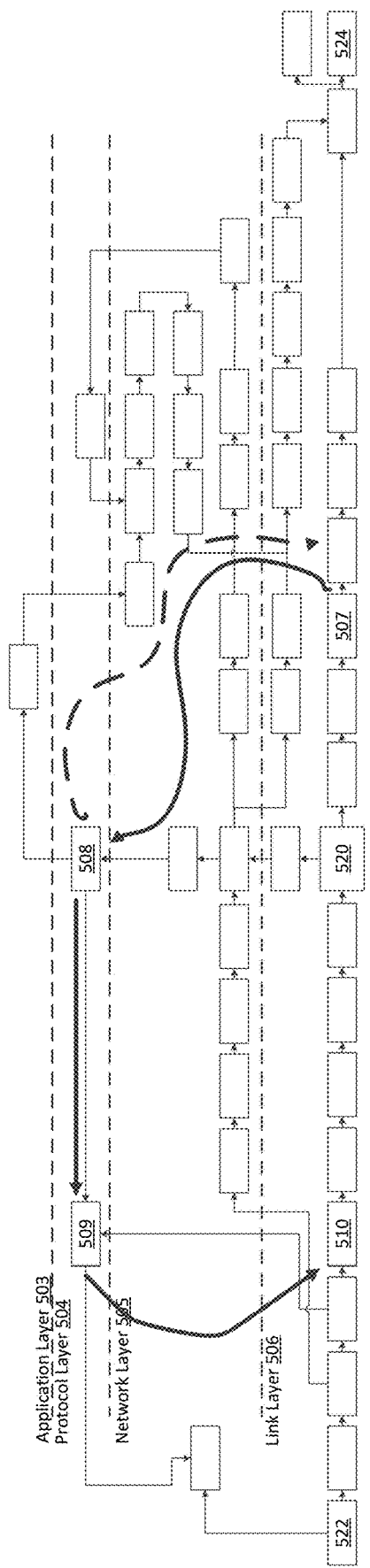
FIG. 5a (as reflected in detail in FIGS. 5a-1 and 5a-2) is an example illustration of an inbound packet flow through modules of a Linux environment, according to an example aspect herein.
Figures 1, 5A:
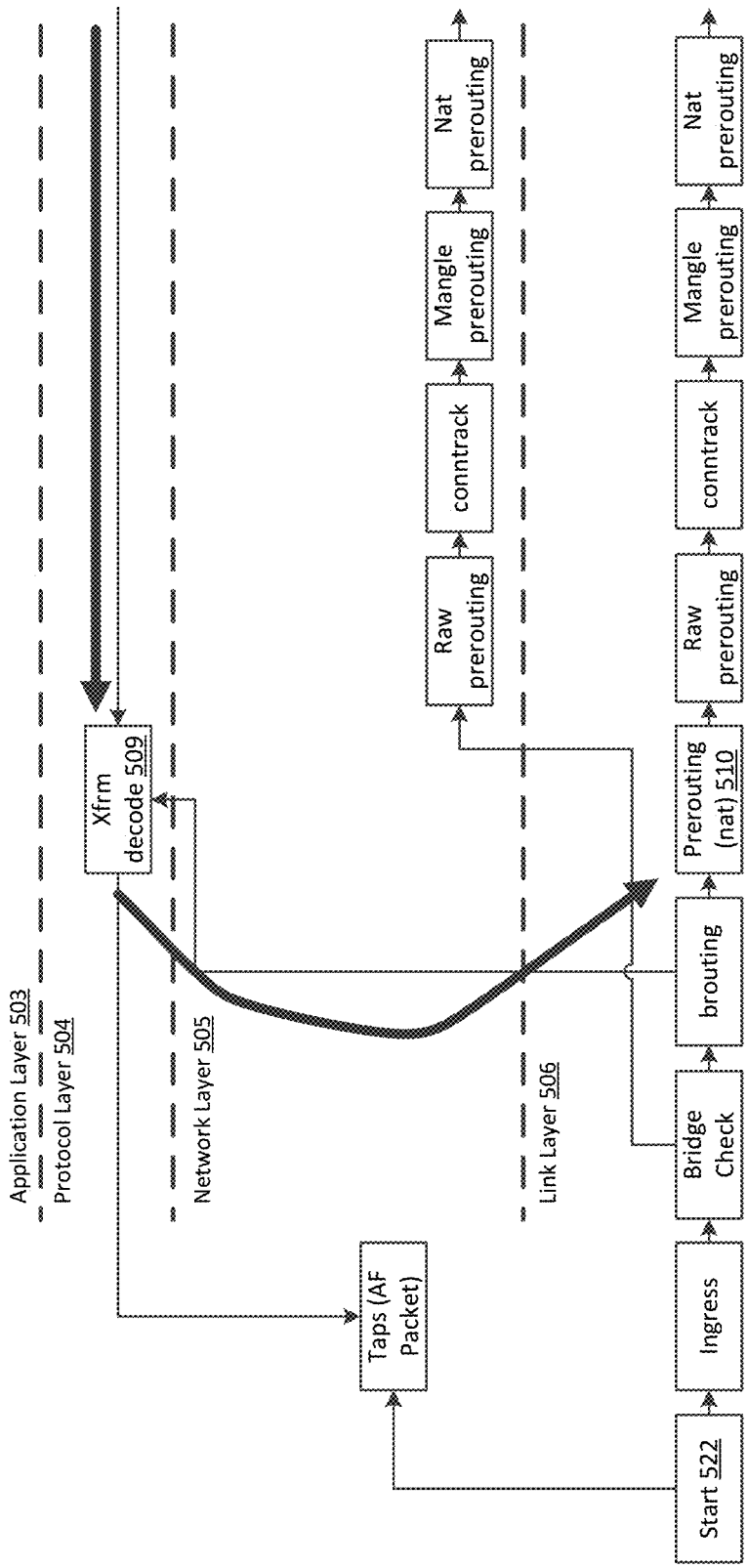
Figures 2, 5A:
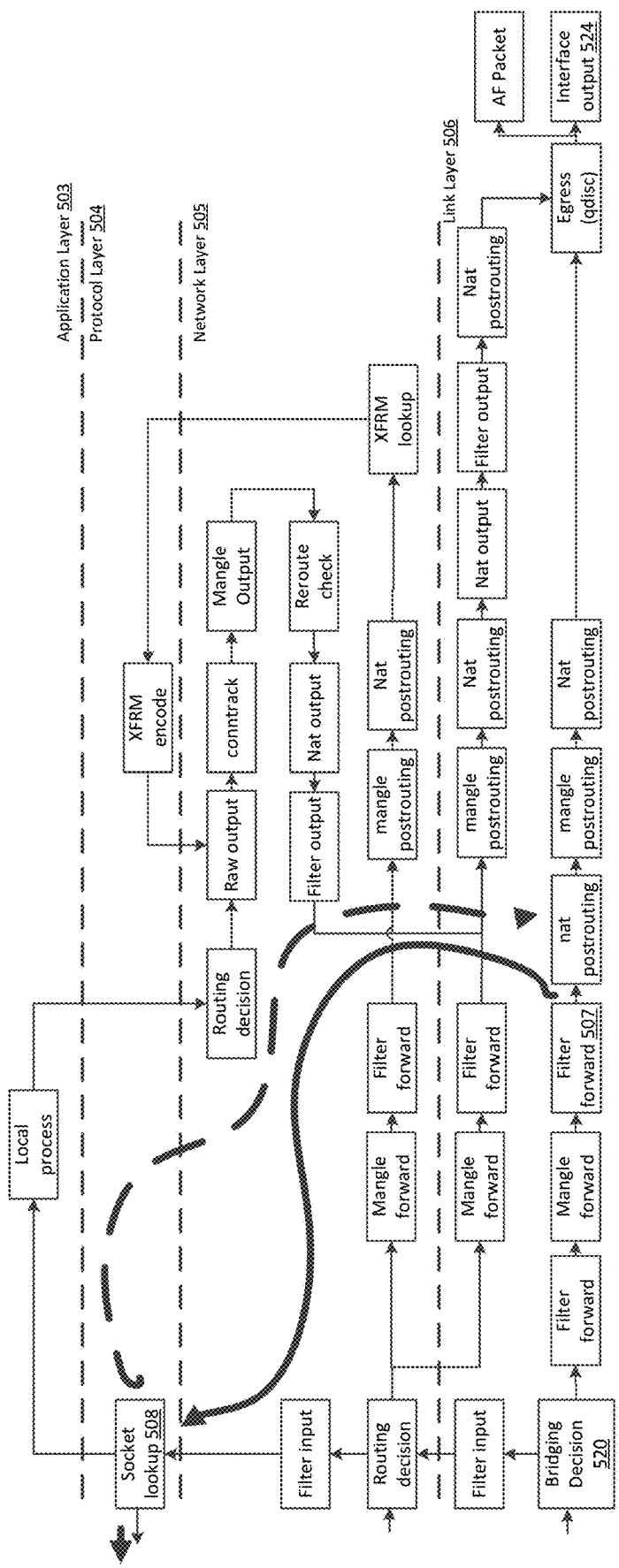
Figure 5B:
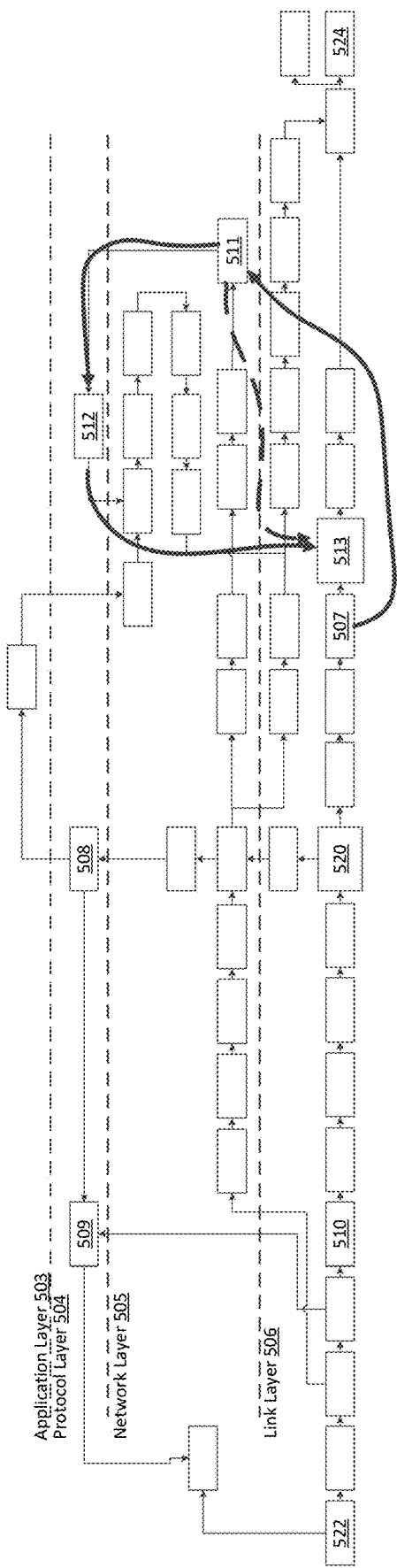
FIG. 5b (as reflected in detail in FIGS. 5b-1 and 5b-2) is an example illustration of an outbound packet flow through modules of a Linux environment, according to an example aspect herein.
Figures 1, 5B:
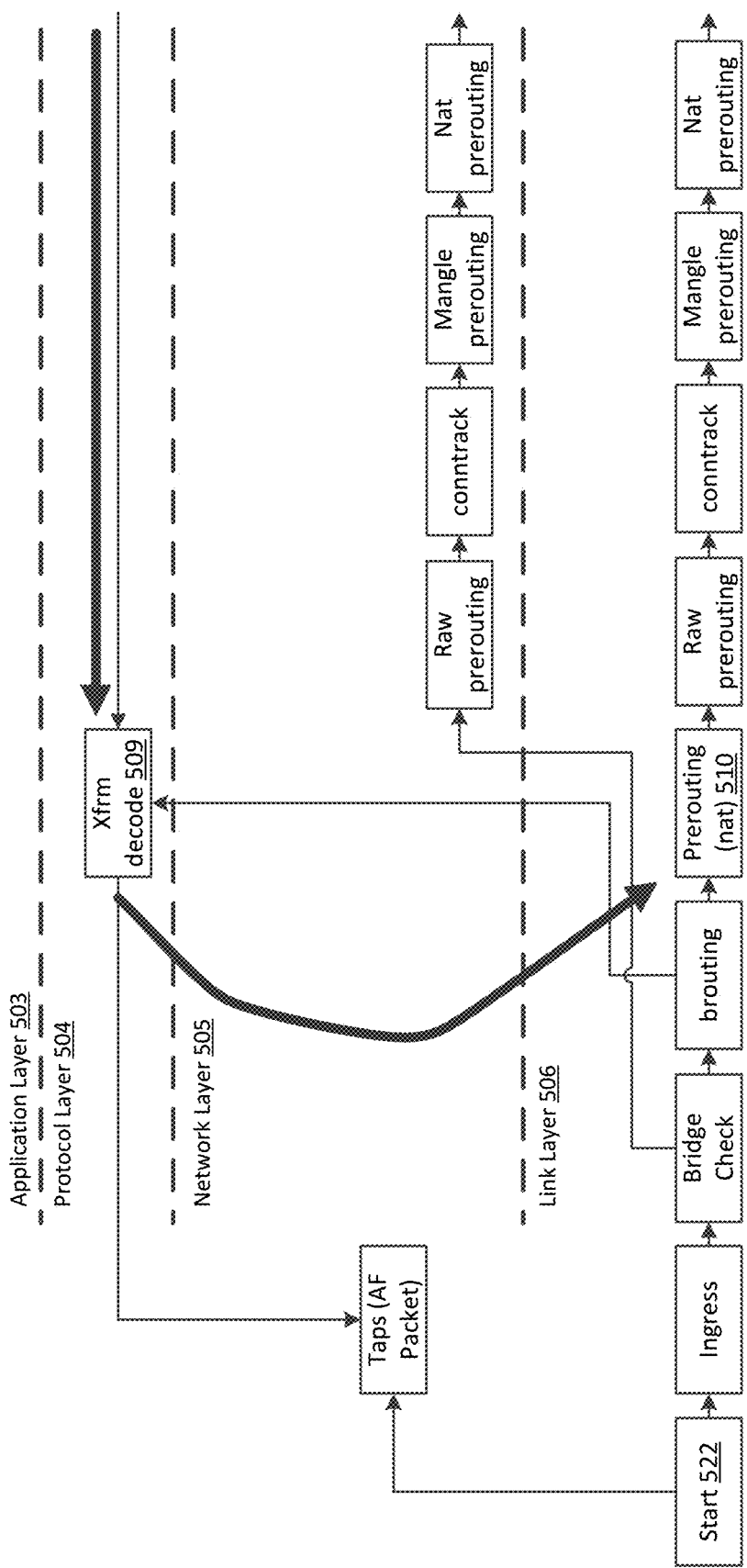
Figures 2, 5B:
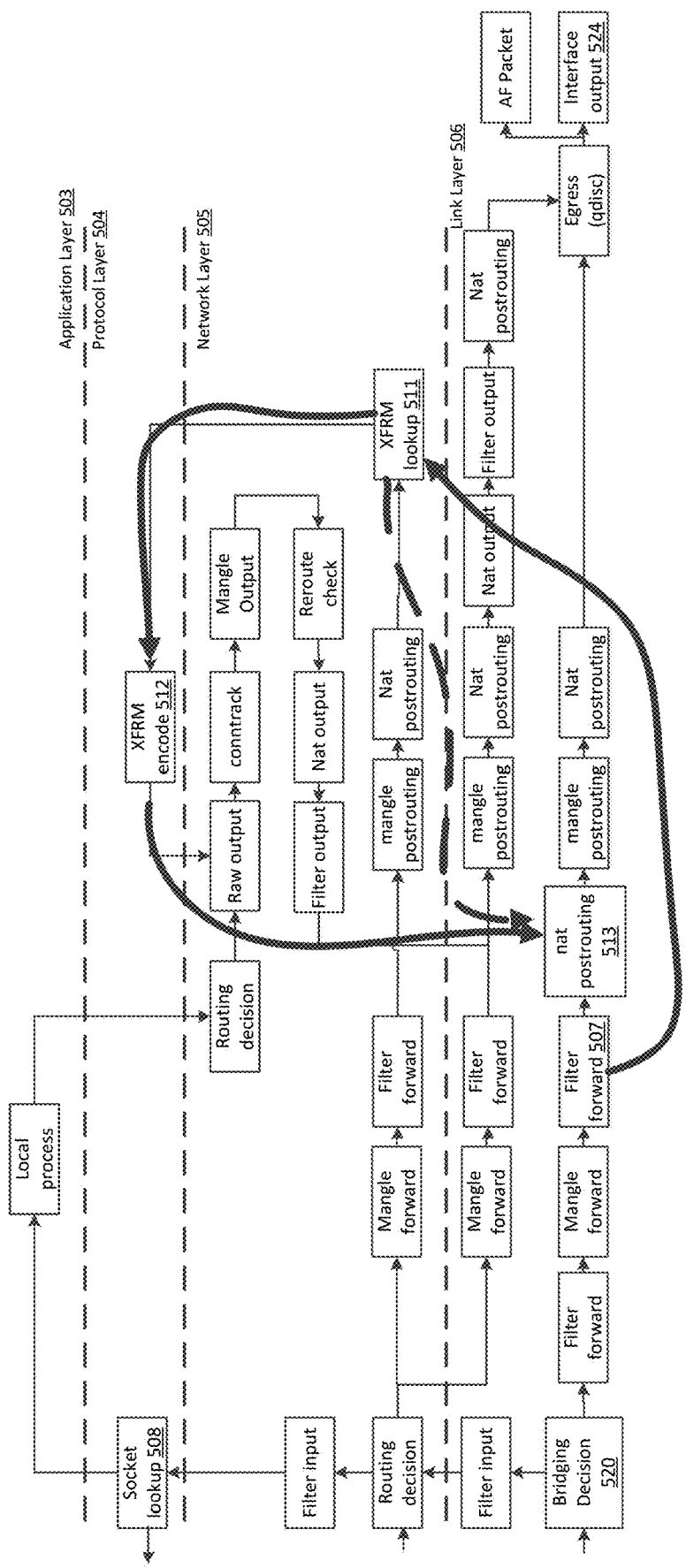

Referring now to FIGS. 4 and 5a-5b, details regarding appliance 105, and in particular packet routing within such an appliance, are described. FIGS. 5a and 5b (as seen in detail in FIGS. 5a-1 and 5a-2, as well as 5b-1, 5b-2, respectively) are example illustrations of an inbound packet flow and an outbound packet flow, respectively, across communication layers, for an input path 500, a forward path 501, and an output path 502, of a bridging device such as the appliance 105 of FIG. 1, according to example embodiments herein. The illustrations are in the context of a Linux environment. The layers shown include an application layer 503, a protocol layer 504, a network layer 505, and a link layer 506.

It is noted that in a typical bridge implementation, bridged packets will be forwarded from an input interface to an output interface within the link layer 506, without requiring processing. This is because at a bridging decision 520, any bridged packets received at an input interface 521 would typically be forwarded directly to an output interface 522. However, as illustrated in the example embodiments herein, FIGS. 5a and 5b represent a Linux network stack modified according to an example aspect herein, to provide for the SMB capability. For example, as represented in FIG. 5a, in the case of an encrypted packet being received, the encrypted packet would pass through the bridging decision 520 normally (because the packet is a bridged packet), and would arrive at a filter forward module 507. The filter forward module 507 recognizes the packet as destined for a cleartext endpoint, and would forward that packet to the xfrm/socket lookup module 508 in the protocol layer 504, which will strip the routing header from the packet. The packet contents would then be further forwarded to xfrm decode module 509, which could be used to decrypt the packet contents, and reattach the packet header. That now-decrypted packet would be returned to the nat prerouting module 510 in the link layer 509. Because the packet is now decrypted, it would be allowed to pass through the link layer (including the filter forward module 507) completely, and be output to a cleartext endpoint via the output interface 522.

Referring to FIG. 5b, the example of receipt of a cleartext packet is discussed. In this example, the cleartext packet would arrive at the filter forward module 507, which would recognize the packet as being destined for an endpoint that is allowed (based on the filters stored at the appliance 105 after authentication) only Stealth-enabled traffic. Accordingly, the filter forward module 507 would forward the packet to xfrm lookup module 511 in the network layer 505, which would strip the packet header, and pass the packet contents to the xfrm encode module 512. The xfrm encode module 512 would encrypt the packet using the COI key(s) for the COI of which the appliance 105 and the intended endpoint are common members (based on the filter rules), and the encrypted packet contents and header would be routed to nat postrouting module 513, which would reattach the header and forward the now-encrypted packet to a Stealth-secured endpoint via the output interface 522.

As described in the Background section above, Stealth is an enterprise security system that (1) authenticates endpoints as part of one or more communities of interest, and (2) assigns one or more filters to one or more endpoints to provide communication permissions that enforce a COI as well. In one example, a COI can be enforced with a set of encryption keys. Each COI corresponds to a role, and a set of COIs can be a use profile. The filters can be, for example, a whitelist or block list of permitted network endpoints to allow specific communications and participants.

According to an example embodiment herein, the appliance 105 authenticates itself with authentication server 134, obtains cryptographic keys associated with a COI, and is connectable to a non-native Stealth device such as CT device 150. Both the appliance 105 and CT device 150 are provided with their own IP addresses via, for example, DHCP. Packets routed between the CT device 150 to other endpoints within network 130 are encrypted or decrypted by the appliance 105 according to, for example, policies provided to the appliance (by, e.g., server 134) and using the cryptographic keys received during authentication.

A method 400 according to an example aspect herein will now be described in greater detail, with reference to the flow diagram shown in FIG. 4. In step 402 the appliance 105 authenticates itself with the authentication server 134 and obtains from that server 134 or from licensing server 136 a set of COI cryptographic keys associated with a particular COI (e.g., a COI that includes devices 102 and 132a as participants). Because the appliance 105 is a bridging appliance, it will receive a single set of COI cryptographic keys, and therefore assumes that although one or more endpoints can be directly connected to the bridging device, any endpoint directly connected to the bridging device on the "cleartext" or non-Stealth side (to the left in FIG. 1) will be part of a common community of interest. At some point thereafter, the appliance 105 receives a packet (step 404) from either CT device 150 or endpoint 132a.

If the packet is determined by the appliance 105 to be a cleartext packet (i.e., a packet received from CT device 150, and thus deemed to belong to the appliance 105) ("Yes" in step 406; module 507 of FIG. 5a), then the appliance 105 determines the packet's destination (such as, e.g., endpoint 132a) based on address information included in the packet (step 408), strips the packet's header, and determines whether there is a policy at the appliance 105 to encrypt the packet (step 409). In step 411, assuming an encryption policy exists for the packet and intended destination, the packet is encrypted according to the policy, based on the cryptographic keys relating to the COI in which the appliance 105 and the destination participates (step 411), and the packet is then forwarded to a postrouting module. In step 413 the appliance 105, at the postrouting module, reattaches the header to the now-encrypted packet (step 413), and forwards the packet towards its destination, such as endpoint 132a (step 415). In one example aspect herein, at least some of the steps 408 to 415 are performed by module 508 of FIG. 5a.

Referring again to step 406, if performance of that step results in a determination that the received packet is encrypted according to cryptographic keys related to the COI (i.e., the packet is an IPsec packet not belonging to the appliance 105, and was sent from an endpoint included in the COI, such as endpoint 132) ("No" in step 406), then the appliance 105 checks an identification number in the packet to determine if there is a policy at the appliance 105 to decrypt the packet (step 416), and then strips the packet's header (step 417). In step 419 the appliance 105 decrypts the packet according to the policy and related keys, reattaches the header to the packet (step 421), and forwards the packet with the reattached header to the endpoint (e.g., CT device 150) to which it is addressed (step 423).

Of course, additional packets that are received by the appliance 105 also are processed according to the method of FIG. 4.

Like a virtual gateway, the appliance 105 can provide Stealth capability on behalf of a network endpoint, such as CT device 150, which does not natively support Stealth capability. Also, rather than acting as a level 3 network router, the appliance 150 acts as if it were a level 2 switch. This allows for automated network discovery and IP discovery pf the CT device 150 from within the Stealth network. For example, an endpoint (such as, e.g., CT device 150) can have a network IP address within a same subnet as other nodes of a Stealth network, such as network 130. The appliance 105 can perform encryption and decryption of IPsec packets, unlike typical bridge devices that cannot do so. In one example embodiment herein, rerouting is performed in Linux to enable such encryption/decryption, as illustrated in FIGS. 5a-5b. Also, in one example embodiment herein, the appliance 105 is not visible to other endpoints besides the CT device 150, as being part of the network 130.

Whether or not to implement a Stealth network using a gateway or a bridge such as appliance 105 can be based on, for example, whether multiple endpoints without Stealth capability need to be Stealth-secured. The appliance 105 can handle multiple hosts, although in one example embodiment herein such hosts all must be members of the same COIs. Behind a gateway, each endpoint can be authenticated separately. Therefore, a typical use case for the appliance 105 may relate to employing only a single endpoint (e.g., CT device 150) in conjunction with the appliance 105. While using a gateway can provide for large scalability, use of the appliance 105 can simplify the connection of an endpoint (such, as, e.g., cleartext endpoint/device 150) to a Stealth network, such as network 130.

In example applications, the appliance 105 can be used to add Stealth-based security to, for example, a printer, a scanner, or a SCADA device that include network communication capabilities, but are incapable of hosting IPsec-based encryption and/or Stealth security software (e.g., computing devices with legacy operating systems). Additionally, network attached machines, web cameras, medical devices (patient monitors, infusion pumps etc.) could be secured using such an appliance. Still other possible applications include securing of smart meters, surveillance and/or location security systems, Internet-of-Things (IoT) devices, power generators (e.g., wind or solar), and/or other geographically distributed systems.

In one example embodiment herein, the appliance 105 can include any hardware that supports Linux, and can include a Raspberry Pi; such a device could correspond to a miniaturized or simplified version of the computing system described above in connection with FIG. 3. In other embodiments, the functions described herein as being performed by the appliance 105 can be performed instead by a virtualized system. The appliance 105 also can include an IPsec module where all traffic traverses the appliance 105 bidirectionally through the IPsec module. Policies can be carried out if they are in place (e.g., a policy specifying that an encrypted packet should be decrypted, or vice versa). While traditionally, a Linux kernel did not conduct IPsec processing on bridged packets, the appliance 105, on the other hand, can perform such processing.

Figure 6:
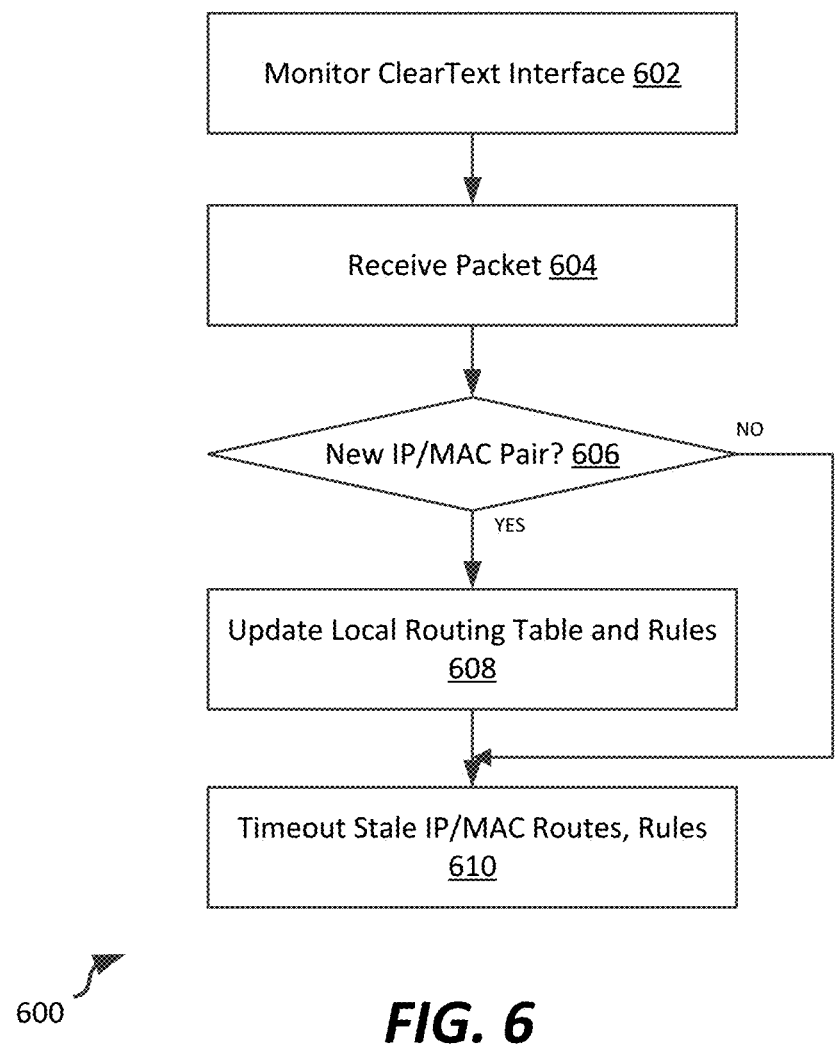
FIG. 6 is an example flow diagram of a method of managing addressing of endpoints accessible via a bridge device, according to aspects of the present disclosure.

Referring now to FIG. 6, a method 600 of managing addressing of endpoints accessible via a bridge device is disclosed. The method 600 can be performed by various devices within the network 130, for example a local network manager provided by an authentication service 134 or other server system used to manage devices within the network, in conjunction with a bridge device 105.

In the example illustrated, the method 600 includes monitoring a cleartext interface (step 602) to determine whether packets are received at the interface, e.g., at bridge device 105. A packet can be received (step 604) and that packet can be analyzed to determine if it is a new IP address and MAC address pair (step 606) indicating that a new device is present within the enterprise network 130 at the bridge device 105. If the IP/MAC address combination is new, local routing table entries and rules can be updated (step 608); this can include, for example, adding a specific routes to a local routing table for the new IP address, adding a rule to a NAT routing chain, and updating ARP tables to allow ARP requests to come from any source IP address that address the new IP address. Additionally, periodically (e.g., whether or not a new IP address or MAC address is detected), a timeout process can be performed, in which stale IP address/MAC address combinations can be removed from local routing tables and rules (step 610), to ensure that devices no longer present in the network 130 are no longer authorized to communicate via bridge 105 or otherwise.

Referring to FIGS. 1-6 overall, it is noted that in addition to the above functionality, it is apparent that specific features are enabled by the appliance as discussed above. For example, when such an appliance 105 is used, it would automatically discover hosts connected on the "cleartext" side of that device. Furthermore, it would support DHCP requests from cleartext hosts, and responses from a secured network. The appliance 105, being transparent to network devices, would allow for pass-through of communications between secured devices and the cleartext hosts as well, and accommodates routers or other subnets on the cleartext side. Other advantages are provided as well, as are apparent from the above disclosure.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A computer-implemented method of securing communications with an enterprise, the method comprising:
   authenticating a bridge appliance with an authentication server associated with an enterprise having secure communications, wherein authenticating the bridge appliance includes receiving a cryptographic key and one or more filters associated with at least one community of interest to which a remote computing device belongs;
   receiving a packet at the bridge appliance, the packet including a source address and a destination address, the source address being one of the remote computing device and a secured computing device within an enterprise network, the destination address being another of the remote computing device and the secured computing device;
   in a case where the packet is encrypted according to the cryptographic key associated with the enterprise,
      removing a routing header from the packet to provide packet contents;
      decrypting the packet contents to provide decrypted packet contents, and
      reattaching the routing header to the decrypted packet contents to form a decrypted packet;
      forwarding the decrypted packet to a remote computing device in communication with the bridge appliance; and
   in a case where the packet is received from the remote computing device in cleartext,
      removing the routing header from the packet to provide the packet contents;
      encrypting the packet contents according to the cryptographic key associated with the enterprise, to provide encrypted packet contents;
      reattaching the routing header to the encrypted packet contents to provide an encrypted packet; and
      forwarding the encrypted packet to an endpoint within the enterprise.

2. The computer-implemented method of claim 1, wherein the remote computing device is in communication with the bridge appliance by way of at least one of a wired interface and a wireless interface.

3. The computer-implemented method of claim 1, wherein authenticating the bridge appliance occurs prior to receiving the packet at the bridge appliance.

4. The computer-implemented method of claim 1, wherein receiving the packet at the bridge appliance comprises receiving the packet from the remote computing device, wherein the remote computing device comprises a cleartext endpoint.

5. The computer-implemented method of claim 1, wherein receiving the packet at the bridge appliance comprises receiving the packet from the endpoint within the enterprise, wherein the packet is encrypted.

6. The computer-implemented method of claim 1, wherein authenticating the bridge appliance further comprises the bridge device securing a license from the authentication server.

7. The computer-implemented method of claim 6, wherein the bridge device secures a license prior to receiving the packet at the bridge appliance.

8. The computer-implemented method of claim 1, wherein the remote computing device is assigned a network address within a valid address space used within the enterprise.

9. A system enabling secured communications with an enterprise, the system comprising:
a bridge appliance comprising:
a memory storing instructions for performing a method of securing communications with an enterprise; and
a processor, operating under control of the instructions to:
authenticating the bridge appliance with an authentication server associated with the enterprise, wherein authenticating the bridge appliance includes receiving a cryptographic key and one or more filters associated with at least one community of interest to which a remote computing device belongs;
receive a packet at the bridge appliance, the packet including a source address and a destination address, the source address being one of the remote computing device and a secured computing device within an enterprise network, the destination address being another of the remote computing device and the secured computing device;
in a case where the packet is encrypted according to the cryptographic key associated with the enterprise,
remove a routing header from the packet to provide packet contents;
decrypt the packet contents to provide decrypted packet contents, and
reattach the routing header to the decrypted packet contents to form a decrypted packet;
forward the decrypted packet to a remote computing device in communication with the bridge appliance; and
in a case where the packet is received from the remote computing device in cleartext,
remove the routing header from the packet to provide the packet contents;
encrypt the packet contents according to the cryptographic key associated with the enterprise, to provide encrypted packet contents;
reattach the routing header to the encrypted packet contents to provide an encrypted packet; and
forward the encrypted packet to an endpoint within the enterprise.

10. The system of claim 9, wherein the bridge appliance comprises a layer 2 bridging device.

11. The system of claim 9, further comprising the authentication server within a secured enterprise network to which the bridge appliance is connected.

12. The system of claim 11, wherein the endpoint within the enterprise is a member of the at least one community of interest to which the remote computing device belongs.

13. The system of claim 9, further comprising the remote computing device, wherein the remote computing device is a device selected from among the group of devices consisting of:
a web camera;
a medical monitoring device;
an infusion pump;
a SCADA device;
a computing device having a legacy operating system installed thereon;
a smart meter;
a location security system;
an Internet-of-Things (IoT) device.

14. The system of claim 9, wherein the routing header is applied at a source endpoint selected from among the remote computing device and the secured computing device and defines a destination endpoint that is another of the remote computing device and the secured computing device.

15. The system of claim 14, wherein the bridge appliance is not directly addressed via the routing header.

16. The system of claim 9, wherein the remote computing device is assigned a network address within a valid address space used within the enterprise.

17. The system of claim 9, wherein the remote computing device is a single endpoint external to the enterprise that is connected to the enterprise via the bridge appliance.

* * * * *